(12) United States Patent
Stanton

(10) Patent No.: US 6,932,477 B2
(45) Date of Patent: Aug. 23, 2005

(54) APPARATUS FOR PROVIDING MULTI-SPECTRAL LIGHT FOR AN IMAGE PROJECTION SYSTEM

(75) Inventor: Douglas Stanton, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/028,140

(22) Filed: Dec. 21, 2001

(65) Prior Publication Data

US 2003/0117591 A1 Jun. 26, 2003

(51) Int. Cl.[7] .............................................. G03B 21/14
(52) U.S. Cl. ...................... 353/31; 362/555; 362/800; 345/46
(58) Field of Search ..................... 353/31, 74; 345/82, 345/83, 39, 44, 46; 362/555, 227, 231, 800

(56) References Cited

U.S. PATENT DOCUMENTS

| | | | | |
|---|---|---|---|---|
| 4,491,863 A | * | 1/1985 | Kurahashi | 348/799 |
| 5,359,345 A | * | 10/1994 | Hunter | 345/102 |
| 5,548,347 A | | 8/1996 | Melnik et al. | 348/761 |
| 5,767,837 A | * | 6/1998 | Hara | 345/694 |
| 6,144,352 A | * | 11/2000 | Matsuda et al. | 345/83 |
| 6,147,720 A | | 11/2000 | Guerinot et al. | 348/744 |
| 6,224,216 B1 | * | 5/2001 | Parker et al. | 353/31 |
| 6,473,092 B1 | * | 10/2002 | Sojourner | 345/589 |
| 6,547,400 B1 | * | 4/2003 | Yokoyama | 353/98 |
| 2002/0015013 A1 | * | 2/2002 | Ragle | 345/82 |
| 2002/0135553 A1 | * | 9/2002 | Nagai et al. | 345/89 |

* cited by examiner

Primary Examiner—William C. Dowling (57) ABSTRACT

A solid state multi-spectral light source for a multi-spectral light source system includes an array of LED groups, wherein each LED group may include red, green, and blue LEDs. The LEDs produce color light bars by activating the appropriate color LEDs. The color light bars can be flashed or scrolled to integrate a color display.

11 Claims, 7 Drawing Sheets

APPARATUS FOR PROVIDING MULTI-SPECTRAL LIGHT FOR AN IMAGE PROJECTION SYSTEM

RELATED APPLICATIONS

Commonly-assigned, copending U.S. patent application, Ser. No. 10/033,959, entitled "METHOD AND APPARATUS FOR PREVENTING UNAUTHORIZED COPYING OF SCREEN IMAGES", filed 27 Dec. 2001.

FIELD OF THE INVENTION

This invention relates to multi-spectral light source systems for image projection devices and systems and, in particular, to a solid state multi-spectral light source for a multi-spectral light source system comprised of different color light-emitting diodes that produce light bars that can be scrolled or flashed.

BACKGROUND OF THE INVENTION

Figure 1:
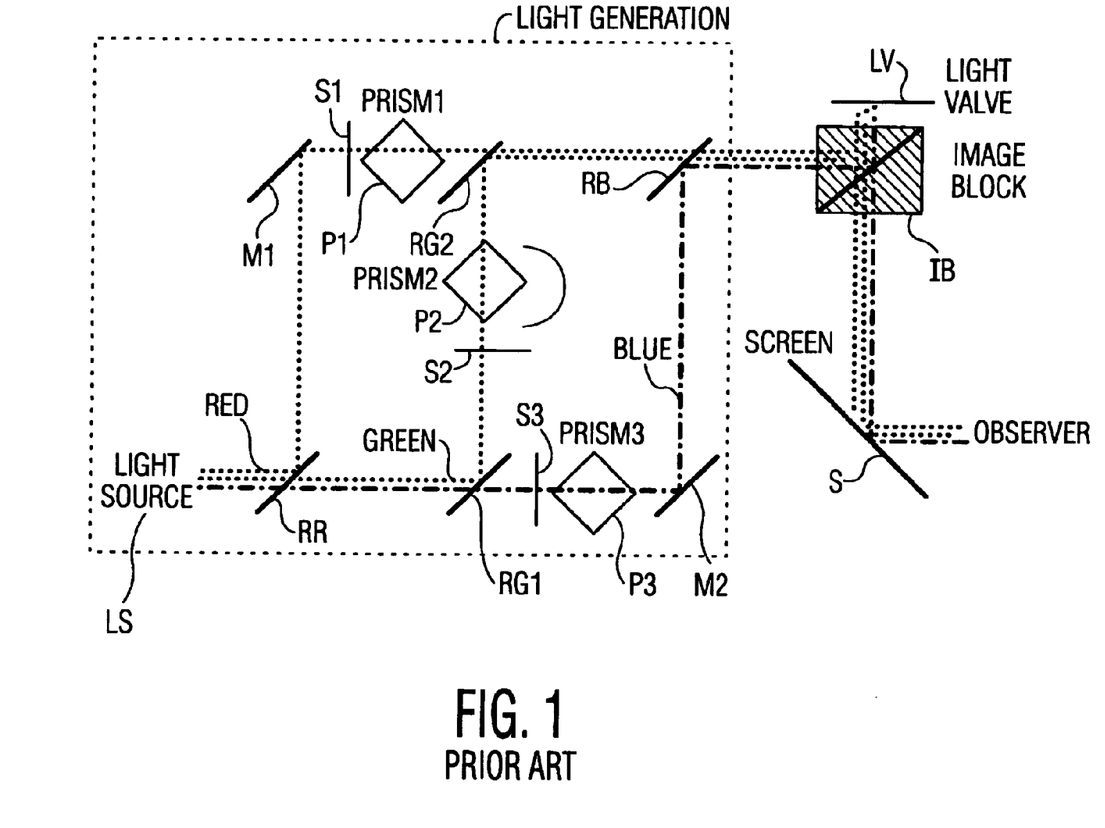
FIG. 1 illustrates a conventional multi-spectral reflective light system.

Multi-spectral light source systems are particularly useful in color image projection devices and systems. One commonly known multi-spectral light source is a reflective light system, which is shown in FIG. 1. This system includes an intense white light source LS produced, for example by an arc lamp. The white light generated by the light source LS can be decomposed into three primary color components, in this case red green and blue light. The first optical element struck by the white light is a dichroic filter RR. Dichroic filters are used in the art for reflecting a desired color of light and passing all other colors of light. The filter RR is placed at about a 45 degree angle so as to reflect the red component of the white light by 90 degrees through a series of additional optical elements. The first one of these elements is a conventional mirror M1 that changes the direction of the red light by about 90 degrees. The red light is then shaped by an optical slit element denoted by the numeral S1 that creates a bar of red light. This bar of red light then passes through a rotating prism P1 so as to cause the red bar of light to scroll across a light valve LV. The scrolling action can progress in many orientations across the light valve e.g. horizontally, vertically or diagonally, but is usually scrolled vertically from top to bottom. Prior to reaching the light valve LV, the scrolling bar of red light passes through two other dichroic filters RG2 and RB that respectively reflect only green and blue light. The scrolling red bar of light then passes through an image block IB and onto the reflective light valve LV. The light valve LV modulates the red light bar with red pixel information to form the red portion of an image which is then reflected back to a screen S. The screen S then reflects the red portion of the image to the observer.

The green component of the white light passes through the filter RR and is reflected via a dichroic filter RG1 that reflects only green light and allows the blue light to pass. The green light, which has now changed direction by 90 degrees, passes through a second optical slit element S2 and a second rotating prism P2. The second slit S2 and prism P2 form a scrolling bar of green light in manner similar to the red bar. The scrolling bar of green light is then reflected by the dichroic filter RG2 to join the green scrolling bar with the red scrolling bar. The two bars do not overlap and maintain their relative position on the light valve via coordinated controls in the rotating prisms P1 and P2. The green bar then passes through the dichroic filter RB to the image block IB and onto the reflective light valve LV. The light valve LV modulates the green light with green pixel information to form the green portion of the image, which is then reflected back to the screen S. The screen S then reflects the green portion of the image to the observer.

The blue component of the white light passes through the filters RR and RG1 where it is shaped by a third optical slit element S3 into a bar of blue light. This bar of light is then scrolled via a third prism P3 in a manner similar to the red and green light. The bar of blue light then reflects off a second conventional mirror M2 and the dichroic filter RB to the image block IB and onto the reflective light valve LV. The light valve LV modulates the blue light with blue pixel information to form the blue portion of the image which is then reflected back to the screen S. The screen S then reflects the blue portion of the image to the observer. More specifically, the scrolling bar of blue light is coordinated with the green and red light so that none of the bars overlap and the entire light valve is illuminated. As the different bars of light progress across the light valve LV, different pixel information is used to modulate the different light colors so that an integrated color image appears to the observer.

Figure 2:
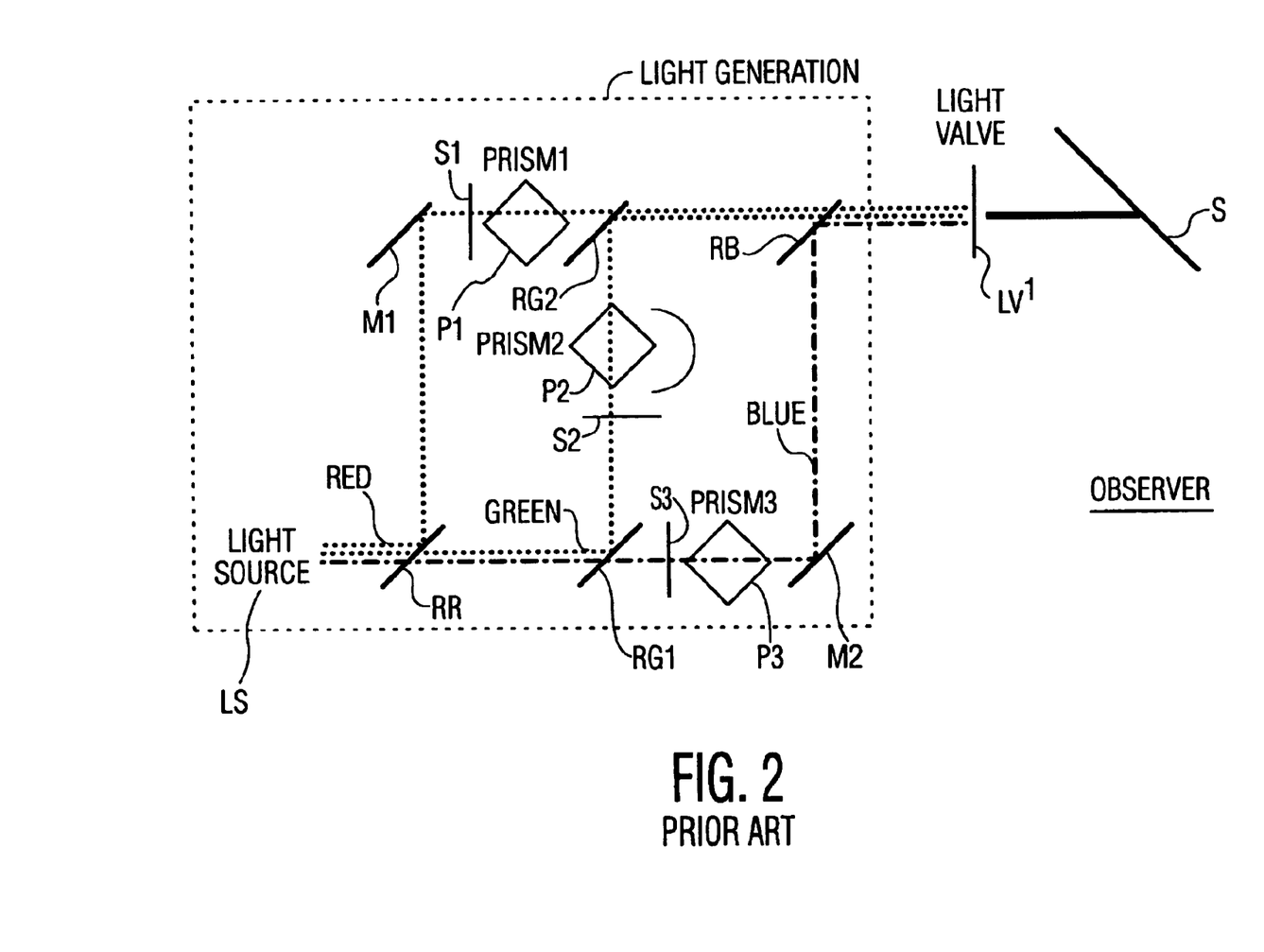
FIG. 2 illustrates a conventional multi-spectral transmissive light system.

FIG. 2 shows another type of commonly known multi-spectral light source, referred to as a transmissive light system. The transmissive light system generates colored light bars in a manner that is substantially identical to the reflective light system described in FIG. 1, except, the light valve LV' modulates light as it passes through to the screen S, which reflects the image to an observer.

Another commonly known multi-spectral light source is a flashing lamp system. Flashing lamp systems employ a static color division system comprised of a lamp for each of the primary colors: red, green, and blue. A color image is provided by sequentially flashing the lamps coordinated with related color information on a light valve (either reflective or transmissive).

These multi-spectral light source systems have some disadvantages. In reflective light systems, the prisms used for spectrally dividing the white light generated by the light source increases the cost, size and power requirements of the system. Flashing lamp systems are also expensive because of the use of multiple lamps with their associated reflectors and lens systems. Since the light generating portions of these systems serve only to create three scrolling or flashing bars of light for illuminating the light valve, a light generating system that can produce scrolling or flashing bars of light while providing reduced space, cost and power requirements would be desirable.

SUMMARY OF THE INVENTION

According to a first aspect of the present invention, a solid state multi-spectral light source comprises a plurality of light-emitting diodes, wherein at least two of the light-emitting diodes produce two different colors.

According to a second aspect of the present invention, a multi-spectral light source system comprises a light valve and the solid state multi-spectral light source described above. The light source scrolls or flashes primary colored light bars onto the light valve to produce a color image.

It is to be understood that these drawings are solely for purposes of illustrating the concepts of the invention and are not intended as a definition of the limits of the invention. It will be appreciated that the same reference numerals, possibly supplemented with reference characters where appropriate, have been used throughout to identify corresponding parts.

DETAILED DESCRIPTION OF THE INVENTION

Figure 3:
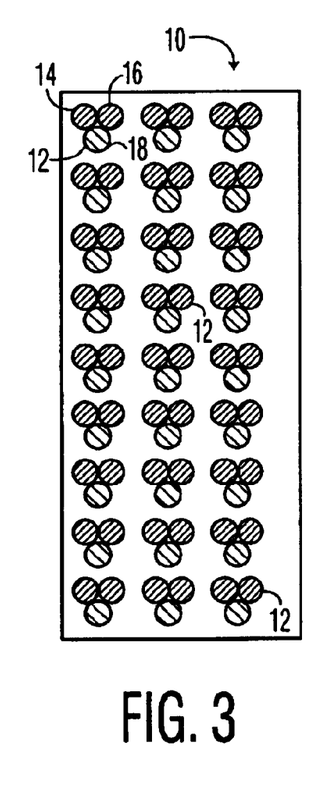
FIG. 3 illustrates a solid state multi-spectral light source according to an exemplary embodiment of the present invention.
Figure 7A:
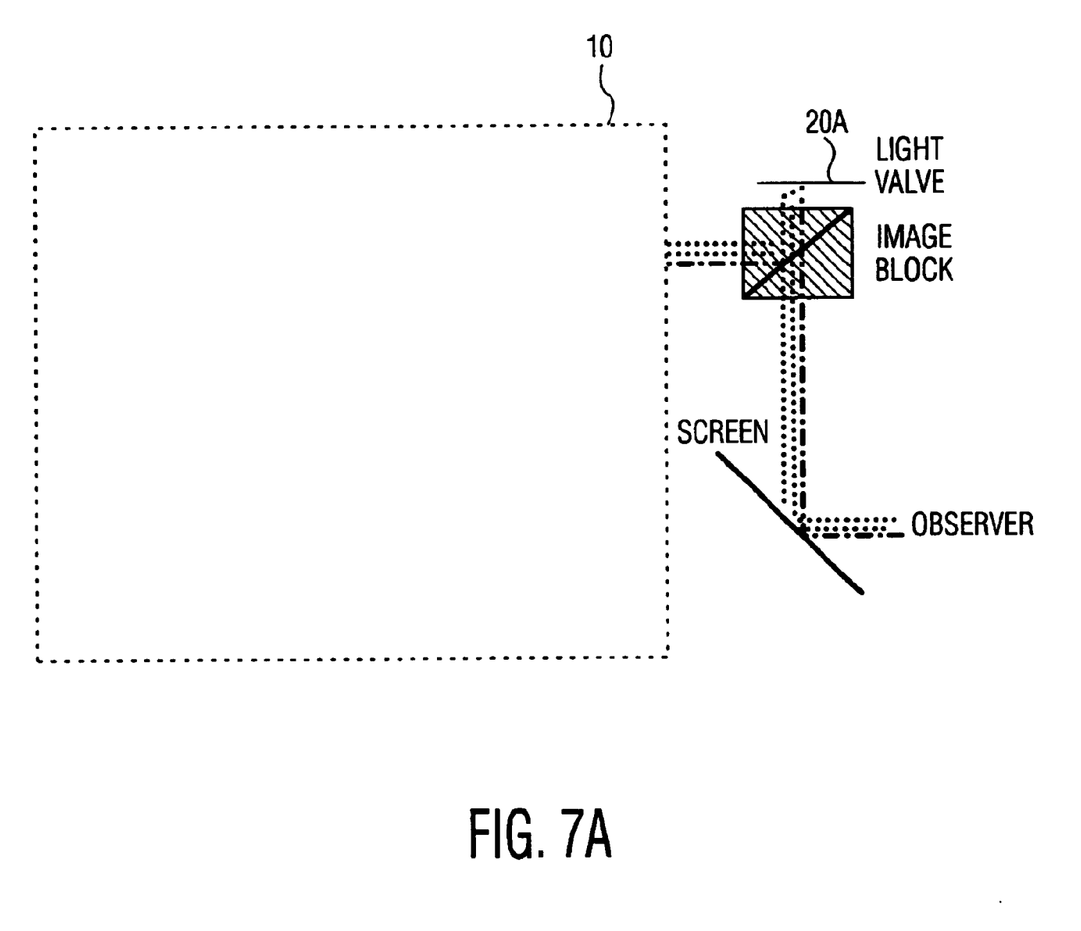
FIGS. 7A and 7B illustrate exemplary multi-spectral light source systems which employ the light source of the present invention.
Figure 7B:
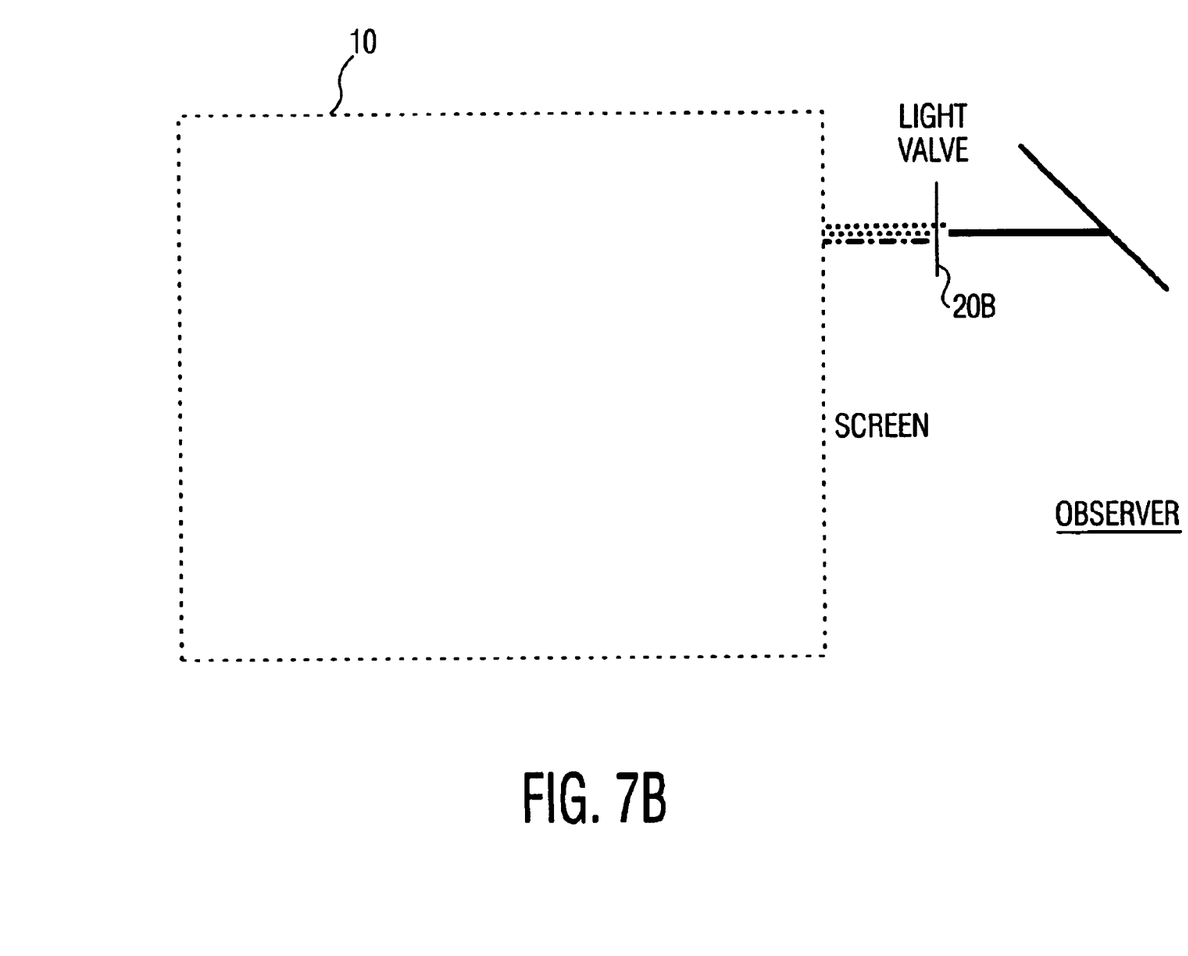

FIG. 3 illustrates a solid state multi-spectral light source 10 according to an exemplary embodiment of the present invention. The light source 10 is comprised of a plurality of light-emitting diode (LED) groups denoted by numeral 12 arranged in an array. In the shown embodiment, each LED group is a triad of a red LED 14, a blue LED 16, and a green LED 18, all of which are conventional in design and operation. The LED groups in other embodiments of the invention may employ different numbers and colors of LEDs. The LEDs 14, 16, 18 of each triad 12 may be arranged in a triangular manner as shown in FIG. 1, or in any other suitable arrangement. The LEDs 14, 16, 18 produce red, green, and blue colored light bars (the primary colors) that may be scrolled or flashed through selective actuation of like colored LEDs in the triads 12 in accordance with an image signal. The light source 10 can produce straight or zig-zagging vertical, horizontal, and diagonal colored light bars which can be scrolled or flashed in substantially any direction. Also, there may be gaps provided between the bars or stripes As illustrated in FIGS. 7A and 7B, the light source 10 of the present invention may be combined with a light valve 20A, 20B to create a multi-spectral light source system. The light valve may be a reflective light valve as shown in FIG. 7A or a transmissive light valve as shown in FIG. 7B. In either system, the light source 10 may be used for scrolling or flashing the colored light bars onto the light valve 20 to produce a color image.

The LEDs 14, 16, 18 may be formed on a single wafer using conventional semiconductor technology, such as silicon or AlInGaN. Alternatively, the LEDs of the may be formed from a plurality of individual substrates or chips (each substrate or chip representing a single LED) on a circuit board.

Figure 4:
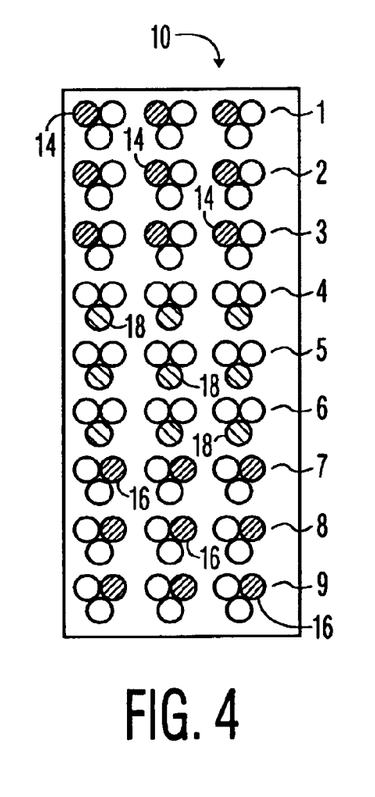
FIG. 4 illustrates a method for producing red, green, and blue light bars using the light source of the present invention.

FIG. 4 illustrates one exemplary mode of operation of the light source of the present invention which produces red, green, and blue light bars. In this particular example, the light bars are straight and extend horizontally. One of ordinary skill in the art will recognize that straight or zig-zagging light bars, which extend vertically or diagonally, can also be produced in a manner consistent with the following discussion. As illustrated, the red LEDs 14 in triad rows 1–3 are actuated to produce a red light bar, the green LEDs 18 in triad rows 4–6 are actuated to produce a green light bar, and the blue LEDs 16 in triad rows 7–9 are actuated to produce a blue light bar.

FIGS. 5A–5E show the light source 10 at five sequentially different times to illustrate a second exemplary mode of operation which produces scrolling red, green, and blue light bars. In this particular example, the light bars to be scrolled are straight and extend horizontally. Moreover, the scrolling moves from the bottom of the light source to the top of the light source. Alternatively, scrolling can be from top to bottom. The light bars can also be straight and extend vertically, and scrolled from left to right or right to left. In addition, diagonally extending, zig-zagging light bars can be produced if desired. Such light bars can be made to scroll from bottom to top, from top to bottom, from left to right or from right to left of the light source 10 in a manner consistent with the following discussion.

Figure 5A:
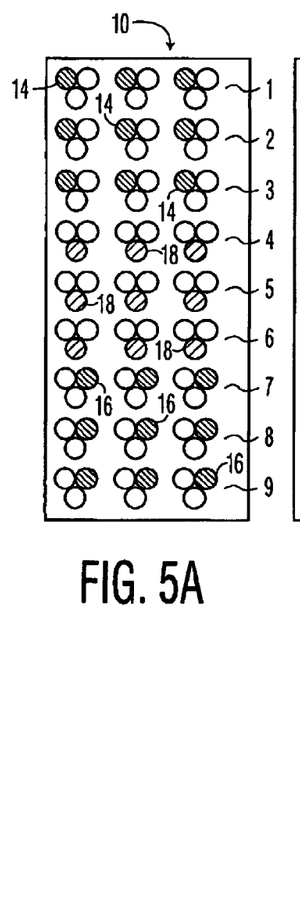
FIGS. 5A–5E illustrate a method according to an exemplary embodiment of the invention for producing scrolling red, green, and blue light bars with the light source of the present invention.

Starting with FIG. 5A, the red LEDs 14 in triad rows 1–3 are actuated to produce a red light bar, the green LEDs 18 in triad rows 4–6 are actuated to produce a green light bar, and the blue LEDs 16 in triad rows 7–9 are actuated to produce a blue light bar.

Figure 5B:
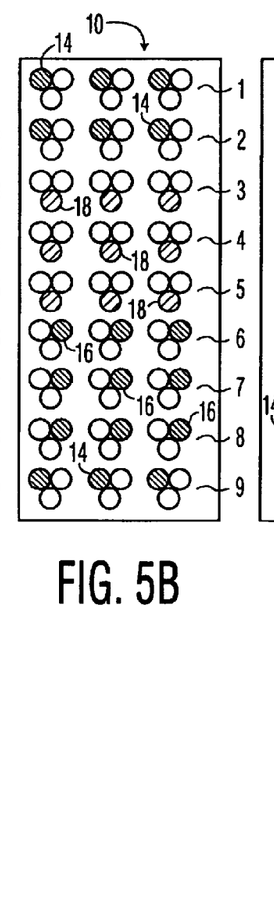
Figure 5C:
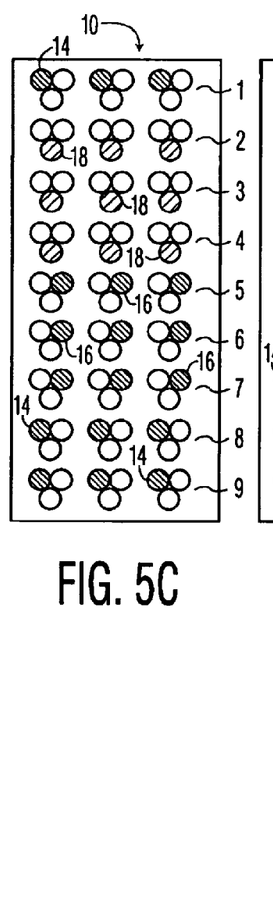
Figure 5D:
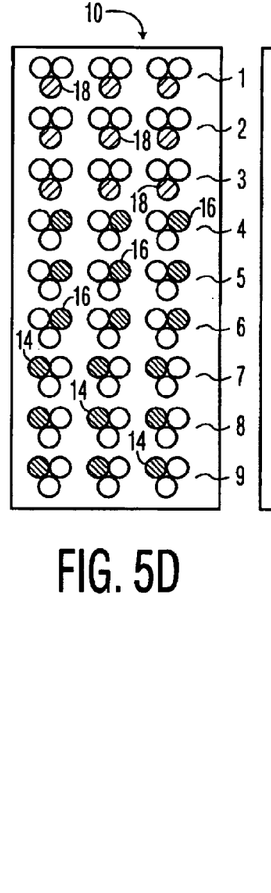
Figure 5E:
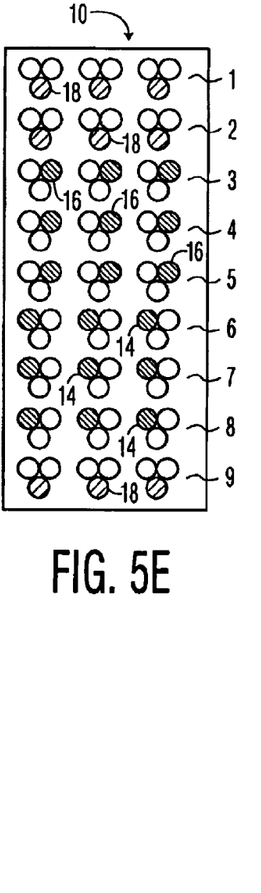

In FIG. 5B, which shows the light source 10 at a subsequent point in time, the red LEDs 14 in triad rows 1–2 are still actuated and producing a portion of the red light bar described above, however, the red LEDs 14 in triad row 3 have been deactuated and the green LEDs 18 in that triad row are now actuated and combine with the green LEDs 18 in triad rows 4 and 5 which are still actuated to produce a green light bar. The green LEDs 18 in triad row 6 have been deactuated and the blue LEDs 16 in that triad row are now actuated and combine with the blue LEDs 16 in triad rows 7 and 8 which are still actuated to produce a blue light bar. The blue LEDs 16 in triad row 9 have been deactuated and the red LEDs in that triad row have been actuated to produce the other portion of the red light bar generated in triad rows 1 and 2. This process is repeated in each of FIGS. 5C–5E to produce bottom-to-top scrolling of red, green, and blue light bars.

Figure 6A:
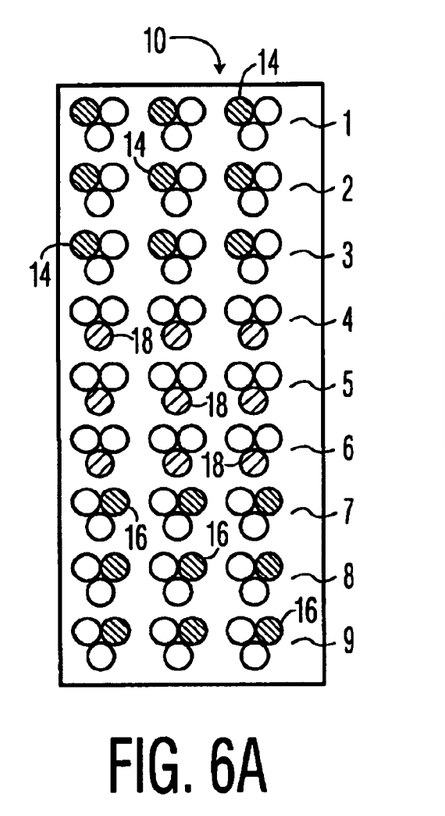
FIGS. 6A–6C illustrate a method according to an exemplary embodiment of the present invention for flashing red, green, and blue light bars with the light source of the present invention.
Figure 6B:
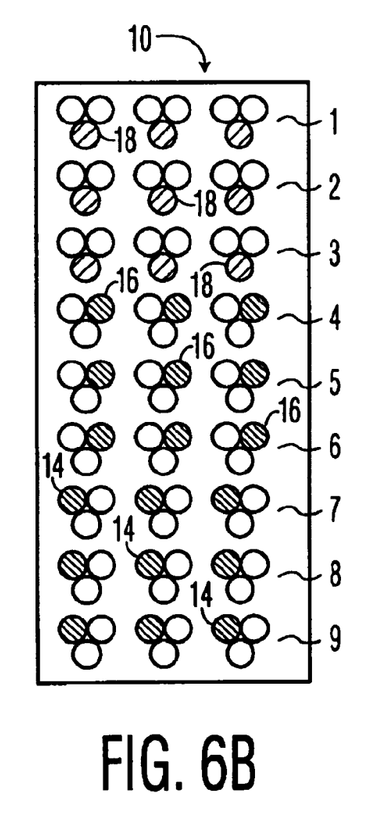
Figure 6C:
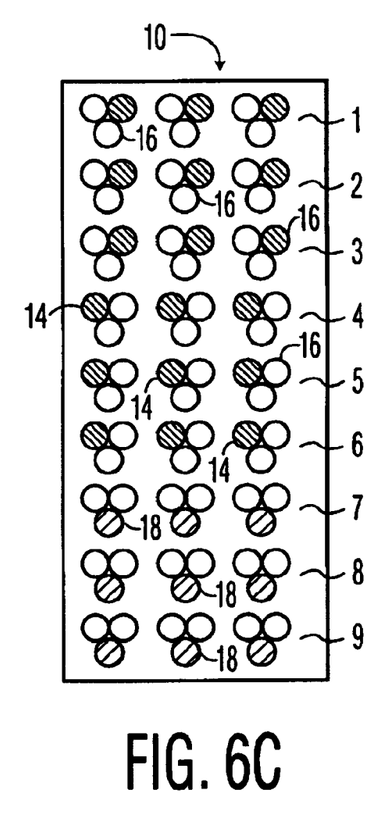

FIGS. 6A–6C show the light source at three sequentially different times to illustrate a third exemplary mode of operation which produces flashing red, green, and blue light bars. In this particular example, the light bars to be flashed are straight and extend horizontally. One of ordinary skill in the art will recognize, however, that straight or zig-zagging light bars, which extend vertically or diagonally, can also be flashed in a manner consistent with the following discussion.

Starting with FIG. 6A, the red LEDs 14 in triad rows 1–3, the green LEDs 18 in triad rows 4–6, and the blue LEDs 16 in triad rows 7–9 are actuated to produce a red-green-blue bar flash.

In FIG. 6B, which shows the light source at a later point in time, the red LEDs 14 in triad rows 1–3, the green LEDs 18 in triad rows 4–6, and the blue LEDs 16 in triad rows 7–9 have been deactuated and the green LEDs 18 in triad rows 1–3, the blue LEDs 16 in triad rows 4–6 and the red LEDs 14 in rows 7–9 are now actuated to produce a green-blue-red light bar flash.

At still another point in time, as illustrated in FIG. 6C, the green LEDs 18 in triad rows 1–3, the blue LEDs 16 in triad rows 4–6, and the red LEDs 14 in triad rows 7–9 have been deactuated and the blue LEDs 16 in triad rows 1–3, the red LEDs 14 in triad rows 4–6, and the green LEDs 18 in triad rows 7–9 are now actuated to produce a blue-red-green light bar flash.

As stated earlier, the solid state multi-spectral light source 10 of the present invention may used in multi-spectral light source systems similar to that shown in FIGS. 7A and 7B. Such systems may be used for preventing the copying of commercial film releases. Unauthorized copying of screen images, such as in cinema theaters, using video recording or camcorder devices is a significant problem for the studios, producers, distributors, and actors. The light source of the present invention may be used in the method and apparatus described in related co-pending U.S. patent application Ser. No. 10/033,959 entitled METHOD AND APPARATUS FOR PREVENTING UNAUTHORIZED COPYING OF SCREEN IMAGES, to prevent such copying.

While the foregoing invention has been described with reference to the above embodiments, various modifications and changes can be made without departing from the spirit of the invention. Accordingly, all such modifications and changes are considered to be within the scope of the appended claims.

What is claimed is:

1. A solid state multi-spectral light source comprising:
   a plurality of light-emitting diodes,
   wherein:
   at least two of the light-emitting diodes produce two different colors, and
   the light source is configured to produce at least two different color light bars that scroll through selective activation of like colored light-emitting diodes in dependence upon an image signal.

2. The light source according to claim 1, wherein the light-emitting diodes are arranged in groups, each group having at least two light-emitting diodes which produce the two different colors.

3. The light source according to claim 2, wherein the light-emitting diode groups each include three light-emitting diodes which produce three different colors.

4. The light source according to claim 1, wherein the light-emitting diodes are defined on a wafer.

5. The light source according to claim 1, wherein the light-emitting diodes are formed by a plurality of substrates disposed on a circuit board, each of the light-emitting diodes corresponding to one of the plurality of substrates.

6. A multi-spectral light source system comprising:
   a light valve; and
   a solid state multi-spectral light source that scrolls different colored light bars onto the light valve to produce a color image, the light source including a plurality of light-emitting diodes, wherein at least two of the light-emitting diodes produce two different colors.

7. The light source system according to claim 6, wherein the light-emitting diodes of the light source are arranged in groups, each group having at least two light-emitting diodes which produce the two different colors.

8. The light source system according to claim 7, wherein the light emitting diode groups of the light source each include three light-emitting diodes which produce three different colors.

9. The light source system according to claim 7, wherein the light-emitting diode groups of the light source produce two different color light bars that scroll through selective actuation of like colored light-emitting diodes.

10. The light source system according to claim 6, wherein the light-emitting diodes of the light source are defined on a wafer.

11. The light source system according to claim 6, wherein the light-emitting diodes of the light source are defined by a plurality of substrates disposed on a circuit board, each of the light-emitting diodes corresponding to one of the plurality of substrates.

* * * * *